(12) United States Patent
Mueller et al.

(10) Patent No.: US 9,513,306 B2
(45) Date of Patent: Dec. 6, 2016

(54) SENSOR UNIT FOR A VEHICLE

(75) Inventors: Wolfgang-Michael Mueller, Stuttgart (DE); Williamson Sy, Schwäbisch Gmünd (DE)

(73) Assignee: Robert Bosch GmbH, Stuttgart (DE)

( * ) Notice: Subject to any disclaimer, the term of this patent is extended or adjusted under 35 U.S.C. 154(b) by 363 days.

(21) Appl. No.: 14/000,299

(22) PCT Filed: Jan. 18, 2012

(86) PCT No.: PCT/EP2012/050717
§ 371 (c)(1),
(2), (4) Date: Mar. 6, 2014

(87) PCT Pub. No.: WO2012/113592
PCT Pub. Date: Aug. 30, 2012

(65) Prior Publication Data
US 2014/0165727 A1 Jun. 19, 2014

(30) Foreign Application Priority Data

Feb. 21, 2011 (DE) .................. 10 2011 004 447

(51) Int. Cl.
*G01P 3/44* (2006.01)
*G01D 11/24* (2006.01)
*G01D 11/30* (2006.01)

(52) U.S. Cl.
CPC ............... *G01P 3/44* (2013.01); *G01D 11/245* (2013.01); *G01D 11/30* (2013.01)

(58) Field of Classification Search
CPC ...... G01D 11/245; G01D 11/30; G01D 5/147; G01P 1/026; G01P 3/488; G01P 1/00; G01P 3/44; G01P 3/487; G01P 1/02; G01P 1/023; B29C 45/14467; B29C 45/14639; B29C 45/14655; B29C 45/1671; G01R 33/0005; G01R 33/02; G01R 33/07; H01R 13/6658; H01R 13/6683; H01R 43/16; H01R 43/24; Y10T 29/4902; Y10T 29/49121; Y10T 29/49158

See application file for complete search history.

(56) References Cited

U.S. PATENT DOCUMENTS 4,548,780 A * 10/1985 Krohn ................ G01K 1/08
264/272.15
5,929,629 A * 7/1999 Hiraoka .............. G01P 1/026
174/520

(Continued)

FOREIGN PATENT DOCUMENTS

DE 197 43 541 A1 9/1998
DE 10 2006 050 177 A1 4/2008
DE 10 2008 005 315 A1 7/2009

OTHER PUBLICATIONS

International Search Report corresponding to PCT Application No. PCT/EP2012/050717, mailed May 15, 2012 (German and English language document) (5 pages).

*Primary Examiner* — Daniel S Larkin
*Assistant Examiner* — Jamar Ray
(74) *Attorney, Agent, or Firm* — Maginot, Moore & Beck LLP

(57) ABSTRACT

A sensor arrangement for a vehicle includes a sensor unit, a cable arrangement, and an elastic cap. The sensor unit has a main support, an electronics part connected to the main support, and a sensor element. The cable arrangement has at least one individual wire, and is configured to electrically contact the electronics part via at least one contact-making member. The main support is an open housing defining at least one insertion opening configured to accommodate the at least one contact-making member and an accommodation pocket configured to at least partially accommodate the (Continued)

electronics part. The elastic cap has a member configured to fasten the sensor unit in the vehicle, is configured to be pushed at least partially over the main support, and closes off the accommodation pocket in a sealed manner.

8 Claims, 4 Drawing Sheets

(56) References Cited

U.S. PATENT DOCUMENTS

| | | | |
|---|---|---|---|
| 6,427,316 B1 | 8/2002 | Shinjo et al. | |
| 7,301,329 B2 | 11/2007 | Borst et al. | |
| 2006/0244439 A1 | 11/2006 | Fukuoka et al. | |
| 2009/0015243 A1* | 1/2009 | Asa | F15B 15/2892 324/207.2 |
| 2009/0314081 A1* | 12/2009 | Christoph | G01D 11/30 73/431 |

* cited by examiner

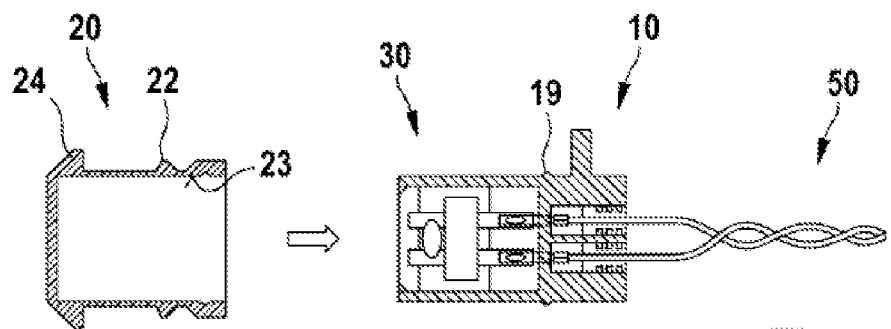
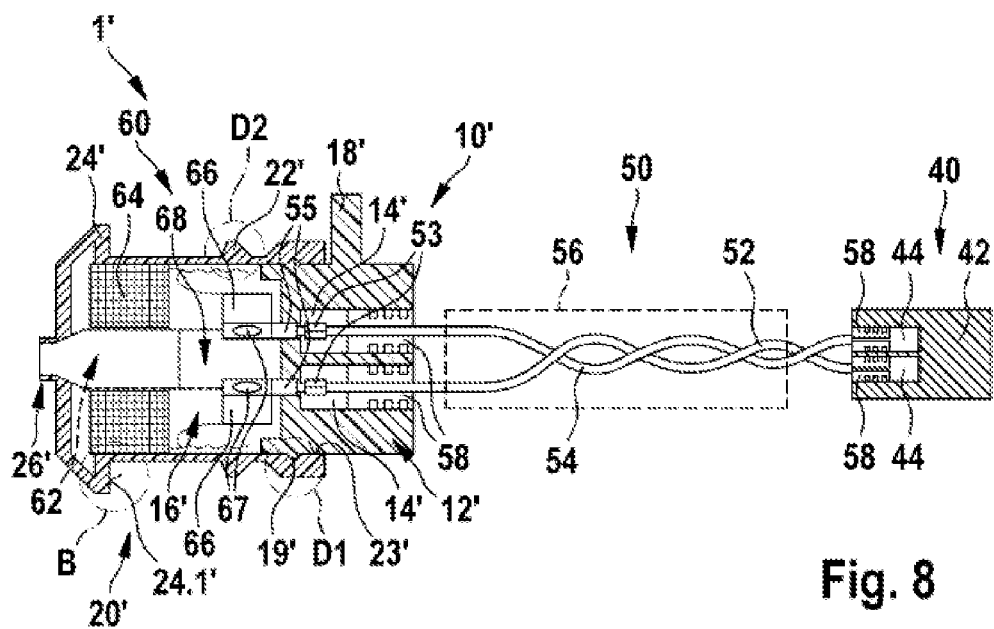

though, as a rule, adopt the temperature of their environment very rapidly, the conductor seal renders it possible in an advantageous manner to prevent the media from penetrating along the single conductor into the interior of the sensor unit.

SENSOR UNIT FOR A VEHICLE

This application is a 35 U.S.C. §371 National Stage Application of PCT/EP2012/050717, filed on Jan. 18, 2012, which claims the benefit of priority to Ser. No. DE 10 2011 004 447.7, filed on Feb. 21, 2011 in Germany, the disclosures of which are incorporated herein by reference in their entirety.

The disclosure relates to a sensor arrangement for a vehicle.

Currently, in the case of two-wheeled vehicles and four-wheeled vehicles sensor arrangements that are arranged in the region of the wheels and are used for example to detect the rotation rate and/or the direction of rotation are encased and/or encapsulated by a synthetic material and are mounted on the vehicle by way of metal inserts that are embodied as mounting bushings. The encapsulation of the sensor units as a protection against environmental influences is generally provided by way of injection molding a mass around a sensor core, which sensor core comprises at least one sensor element and a holding element to hold the sensor element, wherein the sensor element can be contacted in an electrical manner by way of a connecting cable to at least one connecting conductor and/or to a control device. A synthetic material is generally used as a protection against environmental influences, which synthetic material in the hardened state has a more constant effect on the temperature influences and the media influences and as a consequence continues to have an effect over the entire predetermined serviceable life of the sensor elements. This type of encapsulation of special sensor elements is used in the case of connections that are subjected to static, dynamic and/or impact loadings, for example in the case of rotation rate sensor units in the motor vehicle.

A method and a device for producing a sensor unit is described in the unexamined German application DE 10 2008 005 315 A1. The described sensor unit is embodied as a magnetic field sensor, in particular as a rotation rate sensor and/or as a direction of rotation sensor for detecting the wheel rotation and/or for detecting rotational movements in the drive train of a motor vehicle. The sensor unit comprises a sensor core that comprises a sensor element having evaluating electronics and a holding element for holding the sensor element, wherein the sensor element can be contacted in an electrical manner by way of a connecting cable to at least one connecting wire. The sensor core and the end of the connecting cable are encased and/or encapsulated with a synthetic material using an injection molding process, wherein the synthetic material casing often comprises polyamide and glass fibers. A fastening clip for fastening the sensor unit to the motor vehicle is injection molded onto the synthetic material casing. During this second injection molding process a metal mounting bushing is preferably injection molded into the fastening clip. The sensor unit is fastened to the motor vehicle by way of this mounting bushing.

Furthermore, a rotation rate sensor and/or a direction of rotation sensor for a magnetic field sensor that is embodied for a vehicle wheel is described in the unexamined German application DE 10 2006 050 177 A1, in which a synthetic material is injection molded around a magnetic field-sensitive sensor element together with its holding element. The synthetic material casing also encases in this case the end of a connecting cable and is embodied in such a manner that the injection molding mass forms a fastening clip having a mounting bushing for mounting the sensor.

SUMMARY

The sensor arrangement in accordance with the disclosure for a vehicle having the features disclosed herein has in contrast thereto the advantage that it is possible to reduce the costs for the production of the sensor arrangement since only one injection molding process is necessary for the production of the main support that is embodied as the housing and said housing is closed in a sealing manner by an elastic cap and is fastened in the vehicle without the use of screws. In this case, the elastic cap assumes the task of sealing the installation site with respect to the environment in an advantageous manner, i.e. the installation site of the sensor arrangement on a wheel and/or on a gear box and/or on an engine is sealed with respect to the environment by way of the elastic cap. Furthermore, the elastic cap comprises means for fastening the sensor unit in the installation position without the use of screws and further comprises means for internally sealing the sensor unit with respect to the wheel and/or the gear box and/or the engine.

Embodiments of the present disclosure provide a sensor arrangement for a vehicle, which sensor arrangement comprises a sensor unit and a cable arrangement. The sensor unit comprises a main support and an electronic part having a sensor element, which electronic part is connected to the main support. In this case, the electronic part can be contacted in an electrical manner by way of at least one contact-making means to the cable arrangement, which contact-making means comprises at least one single conductor. In accordance with the disclosure, the main support is embodied as an open housing that comprises at least one insertion opening for receiving the at least one contact-making means and a receiving pocket for at least partial receiving the electronic part, wherein an elastic cap having means for fastening the sensor unit in the vehicle is provided, which elastic cap can be at least partially pushed over the main support that is embodied as a housing and which elastic cap closes the receiving pocket in a sealing manner.

Advantageous improvements of the sensor arrangement for a vehicle are rendered possible by way of the measures and further developments disclosed herein.

It is particularly advantageous, that the main support is embodied as a synthetic material injection molded part having a positioning lug. This renders it possible in an advantageous manner to assemble the sensor arrangement in a positionally-correct manner in the installation site in the vehicle.

In an advantageous embodiment of the sensor arrangement in accordance with the disclosure the at least one contact-making means comprises at least one first contact site for contacting the electronic part and at least one second contact site for contacting the cable arrangement. In this case, the at least one first contact site can be embodied by way of example as a welded connection and/or the at least one second contact site can be embodied as a crimped connection.

In a further advantageous embodiment of the sensor arrangement in accordance with the disclosure the at least one contact-making means is inserted with an end of a corresponding single conductor into an associated insertion opening, wherein the associated insertion opening is sealed by way of a single conductor seal that is mounted in an axial manner on the single conductor. Conductors having a casing and conductors that are injection molded in a sensor housing harbor the danger that moisture can pass along the conductors and/or the single conductors and penetrate the interior of the sensor unit, as a consequence of which corrosion can occur or malfunctions can arise. The use of individual conductors having single conductor seals prevents in an advantageous manner this type of moisture penetration which occurs as a result of leakage along the conductors. If a sheathed conductor is nonetheless required for reasons of strength and safety, then the casing is arranged around the single conductors at a sufficient distance from the sensor unit and fixed.

In a further advantageous embodiment of the sensor arrangement in accordance with the disclosure, the fastening means of the elastic cap comprises a stop surface that in the assembled state lies on an edge of an assembly opening of an assembly region. In addition or as an alternative thereto, the fastening means of the elastic cap can comprise an outwardly open groove that in the assembled state encompasses an edge of an assembly opening in the assembly region.

In a further advantageous embodiment of the sensor arrangement in accordance with the disclosure, the elastic cap comprises an internal sealing surface that together with a sealing bead that is arranged on the main support embodies an internal sealing region, in order to seal the sensor arrangement with respect to the installation site and in an advantageous manner to prevent moisture penetrating the receiving pocket of the main support.

In a further advantageous embodiment of the sensor arrangement in accordance with the disclosure, the elastic cap comprises an external sealing lip that together with a corresponding surface of an assembly opening embodies an external sealing region in order to seal the installation site with respect to the environment and in an advantageous manner to prevent any leakage on the vehicle equipment assembly in which the sensor arrangement is installed.

In a further advantageous embodiment of the sensor arrangement in accordance with the disclosure, the electronic part having the sensor element and a permanent magnet is embodied as an active sensor in the form of an application specific integrated circuit having a Hall element and/or a magneto-resistive element and an evaluating circuit or as a passively inductive sensor having a coil and a pole piece, wherein at least one contact connecting piece is provided for contacting the corresponding sensor element.

Exemplary embodiments are illustrated in the drawings and are further explained in the following description. In the drawings, like reference numerals indicate components and/or elements that perform like and/or similar functions.

BRIEF DESCRIPTION OF THE DRAWINGS

FIG. 7 illustrates a schematic illustration of the sensor arrangement in accordance with the disclosure prior to mounting the elastic cap.

FIG. 8 illustrates a schematic sectional view of a second exemplary embodiment of a sensor arrangement in accordance with the disclosure.

DETAILED DESCRIPTION

Figure 1:
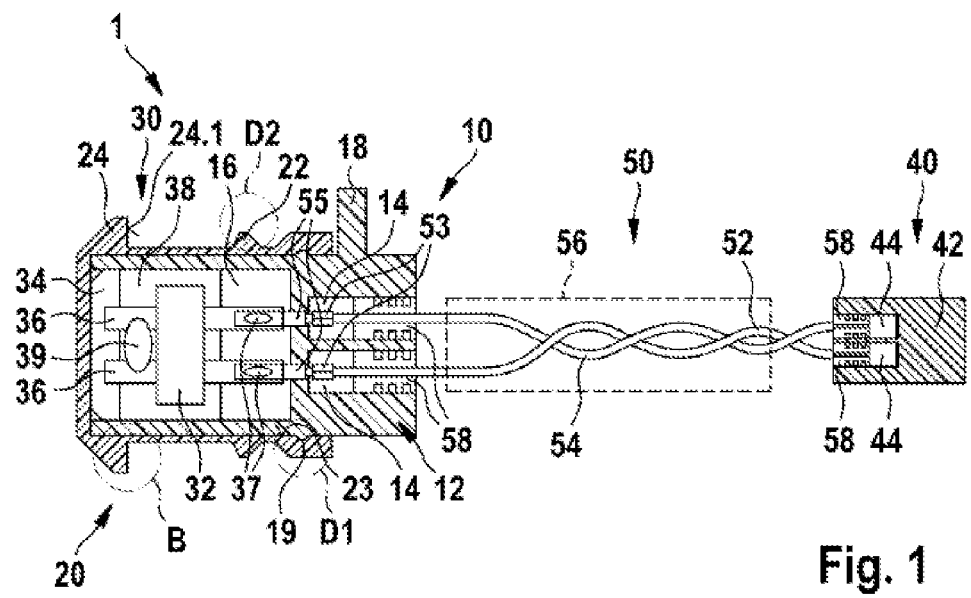
FIG. 1 illustrates a schematic sectional view of a first exemplary embodiment of a sensor arrangement in accordance with the disclosure.

As is evident in FIGS. 1 to 7, the illustrated first exemplary embodiment of a sensor arrangement 1 in accordance with the disclosure for a vehicle comprises a sensor unit 10, a plug connector 40 and a cable arrangement 50. The sensor unit 10 comprises a main support 12 and an electronic part 30 that is connected to the main support 12 and comprises a sensor element 34. The electronic part 30 is contacted in an electrical manner by way of at least one contact-making means 37, 53 to the cable arrangement 50 that comprises at least one single conductor 52, 54.

In accordance with the disclosure, the main support 12 is embodied as an open housing, which housing comprises at least one insertion opening 14 for receiving the at least one contact-making means 37, 53 and a receiving pocket 16 for at least partially receiving the electronic part 30. Furthermore, an elastic cap 20 having means 24 for fastening the sensor unit 10 in the vehicle is provided, which elastic cap 20 is at least partially pushed over and/or pressed on to the main support 12 that is embodied as a housing and which elastic cap closes the receiving pocket 16 in a sealing manner. In the illustrated exemplary embodiment, the main support 12 is embodied as a synthetic material injection molded part having a positioning lug 18, which positioning lug renders it possible to assemble the sensor arrangement 1 in a positionally-correct manner in the vehicle.

In the illustrated first exemplary embodiment, the electronic part 30 of the sensor arrangement 1 is embodied as an active sensor in the form of an application-specific integrated circuit (ASIC) 34 having a sensor element that is embodied as a Hall element and comprises an integrated evaluating circuit for preparing the measurement signals and outputting the measured value. The magnetic field for generating measurement signals is provided by a cylindrical permanent magnet 38 that is arranged according to the requirements of the magnetic circuit immediately adjacent to the ASIC-component 34. Two conductors that are embodied as contact connecting pieces 36 are by-passed by a capacitor 32 in order to reduce signal spikes and are connected in an electrical manner by way of the at least one contact-making means 37, 53 to the single conductors 52,54 of the cable arrangement 50. As a consequence, the electronic part 30 of the first exemplary embodiment of the sensor arrangement 1 is embodied as an ASIC-component 34 having two conductor connectors 37, 53. The ASIC-component 34 is fastened by way of a "hot dip melting process" so that a hot dip melting spot 39 fastens the ASIC-component 34 to the main support 12 that is embodied as an open housing. The assembled permanent magnet 38 is preferably embodied as an NdFeB-magnet (neodymium iron boron magnet).

As is further evident in FIG. 1, the contact-making means in the illustrated exemplary embodiment comprises two first contact sites 37 for contacting the electronic part 30 and two second contact sites 53 for contacting the cable arrangement 50, wherein the two first contact sites 37 are embodied as a welded connection and the two second contact sites 53 are embodied as a crimped connection. The contact connecting pieces 36 and the crimp connectors 55 of the second contact sites 53 preferably comprise the same material thickness, so that the ASIC-component 34 is welded by way of the contact connecting pieces 36 directly to the crimp connectors 55. A strain relief is already integrated in the crimp connectors 55, so that the loadings on the weld sites are reduced. The contact-making means 37, 53 in each case are inserted with an end of a corresponding single conductor 52, 54 into an associated insertion opening 14 of the main support 12, wherein the associated insertion opening 14 is sealed by way of a single conductor seal 58 that is mounted in an axial manner on the single conductor 52, 54. In a similar manner, the other ends of the single conductors 52, 54 are connected to corresponding crimp connectors 55 by way of crimped connections 53 and inserted and retained in corresponding insertion openings 44 in a housing 42 of the plug connector 40. The single conductors 52, 54 are also sealed on the plug connector side in the insertion openings 44 in the housing 42 of the plug connector 40 by way of single conductor seals 58 that are mounted in an axial manner. In the illustrated exemplary embodiment, the single conductors 52, 54 of the cable arrangement 50 are twisted and are encased by a casing 56 that is illustrated by the dashed line and comprises a sufficiently large spacing with respect to the sensor unit 10 and the plug connector 40 in order to avoid moisture penetrating the sensor unit 10.

As is further evident in FIG. 1, the elastic cap 20 comprises an internal sealing surface 23 that together with a sealing bead 19 that is arranged on the main support 12 embodies an internal sealing region D1 in order to prevent moisture penetrating the receiving pocket 16.

Figure 9:
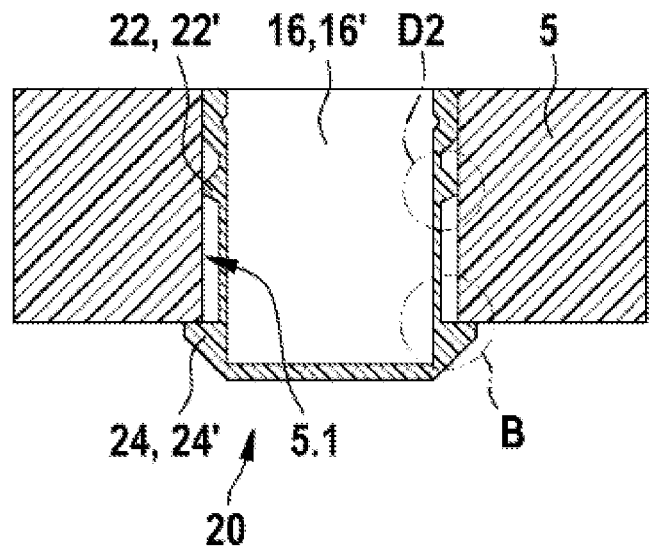
FIG. 9 illustrates a schematic sectional view of a first installation region for the exemplary embodiments of a sensor arrangement in accordance with the disclosure in FIG. 1 or 8.

As is further evident in FIG. 1, the fastening means 24 of the elastic cap 20 comprises a stop surface 24.1 that in the assembled state lies on an edge of an assembly opening 5.1 of an assembly region 5 and embodies a fastening region B, as is evident in FIG. 9. Furthermore, the elastic cap 20 comprises an external sealing lip 22 that together with a corresponding surface of an assembly opening 5.1 embodies an external sealing region D2. The assembly region 5 illustrated in FIG. 9 represents by way of example the assembly site on a vehicle wheel or on a vehicle motor. The second sealing region D2 as a consequence seals the vehicle wheel and/or the vehicle motor with respect to the environment.

Figure 10:
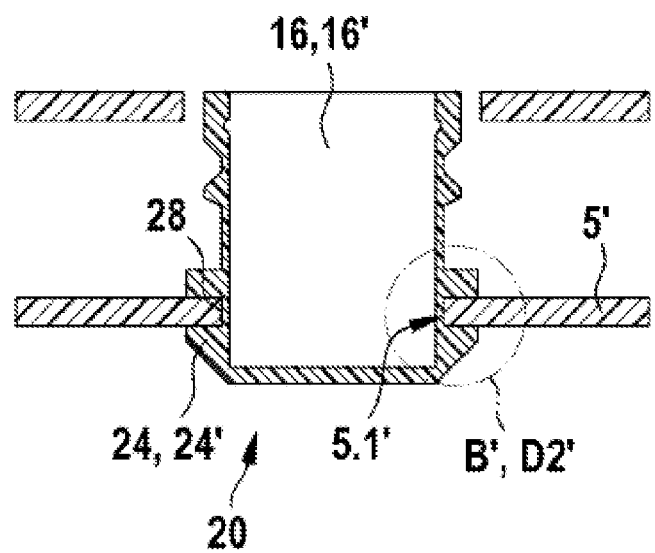
FIG. 10 illustrates a schematic sectional view of a second installation region for the exemplary embodiments of a sensor arrangement in accordance with the disclosure in FIG. 1 or 8.

Alternatively, the fastening means 24 of the elastic cap 20 can comprise an outwardly open receiving groove 28 that in the assembled state encompasses an edge of an assembly opening 5.1' in the assembly region 5' and embodies a fastening region B', as is evident in FIG. 10. The outwardly open receiving groove 28 together with corresponding surfaces of the assembly opening 5.1' simultaneously embodies an external sealing region D2'. The assembly region 5 illustrated in FIG. 10 represents by way of example the assembly site on a vehicle gear box. As a consequence, the second sealing region D2' seals the gear box with respect to the environment.

Embodiments of the present disclosure render possible a simple, cost-effective production process in an advantageous manner, which is described later with reference to FIGS. 2 to 7.

Figure 2:
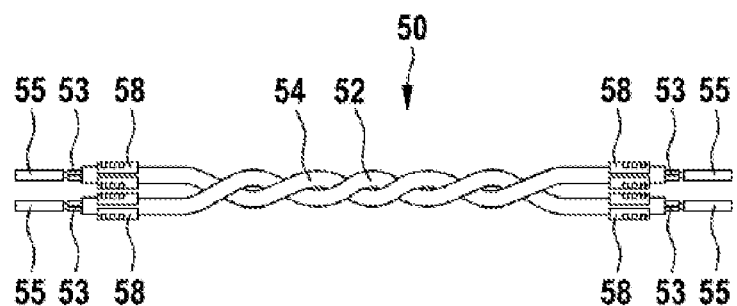
FIG. 2 illustrates a schematic illustration of a cable arrangement for the sensor unit in FIG. 1 in accordance with the disclosure.

As is evident in FIG. 2, single cable seals 58 are arranged on the single conductors 52, 54 on the plug connector side end of the cable arrangement 50 for assembling the twisted cable arrangement 50. The male crimp connectors 55 and the plug connector-side ends of the single conductors 52, 54 of the cable arrangement 50 are then crimped in order to produce corresponding crimped connections 53. In a similar manner, single cable seals 58 are arranged on the sensor side end of the cable arrangement 50 on the single conductors 52, 54 of the cable arrangement 50. The female crimp connectors 55 and the sensor-side ends of the single conductors 52, 54 of the cable arrangement 50 are then crimped in order to produce corresponding crimped connections 53.

Figure 3:
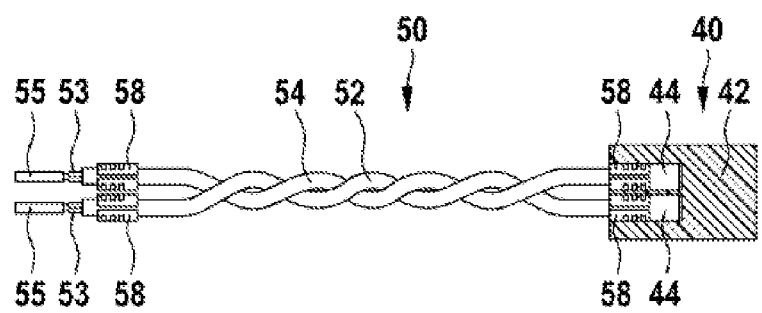
FIG. 3 illustrates a schematic illustration of the cable arrangement in FIG. 2 having a mounted plug connector.

As is evident in FIG. 3, the male crimp connectors 55 for assembling the plug connectors 40 are inserted and retained in the insertion openings 44 in the housing 42 of the plug connector 40.

Figure 4:
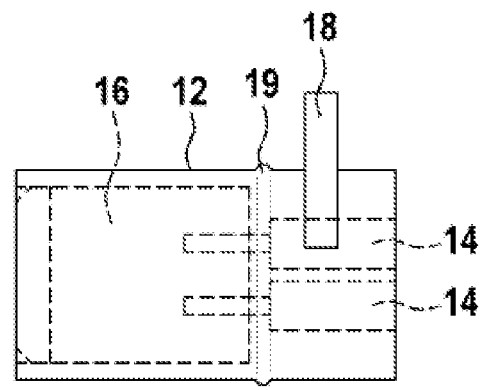
FIG. 4 illustrates a schematic lateral view of a main support for the sensor unit in accordance with the disclosure in accordance with FIG. 1.
Figure 5:
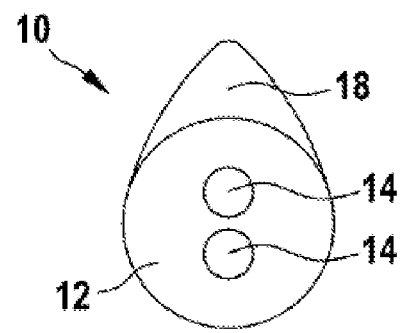
FIG. 5 illustrates a schematic front view of the main support in FIG. 4.

As is further evident in FIGS. 4 and 5, the main support of the sensor unit 10 comprises two insertion openings 14, the sealing bead 19, the positioning lug 18 and the receiving pocket 16, which main support is embodied as an open housing.

Figure 6:
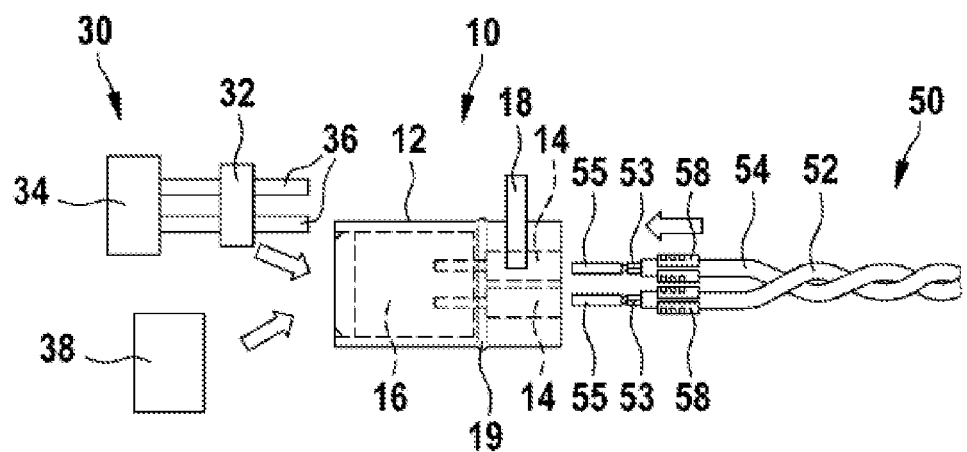
FIG. 6 illustrates a schematic illustration of individual components of the sensor arrangement in accordance with the disclosure in FIG. 1 prior to assembly.

As is further evident in FIG. 6, the permanent magnet 38 is mounted in the main support 12 by way of being pressed into a corresponding receiving device. The cable arrangement 50 is assembled in the main support 12 by way of inserting the cable ends of the single conductors 52, 54 with the contact-making means 53 and crimp connectors 55 into the corresponding insertion openings 14 in the main support 12, wherein the cable ends are inserted so far into the insertion openings 14 until said insertion orifices are sealed by way of the single conductor seals 58. The bent-over ASIC component 34 having contacting connecting pieces 36 that have been cut to length are subsequently placed in a corresponding receiving pocket 16 and said ASIC component 34 is fastened by means of a hot dip melting process. Furthermore, the contact connecting pieces 36 of the ASIC-component 34 are welded to the female crimp connectors 55.

As is evident in FIG. 7, the sensor unit 10 is sealed in a fluid-tight manner by means of pushing and/or pressing the elastic cap 30, which is embodied for example as a rubber cap, on to the main support 12 that is embodied as an open housing.

As is evident in FIG. 8, the illustrated second exemplary embodiment of a sensor arrangement 1' in accordance with the disclosure for a vehicle comprises a sensor unit 10', a plug connector 40 and a cable arrangement 50. The sensor unit 10' comprises a main support 12' and an electronic part 60 having a sensor element 64, which electronic part 60 is connected to the main support 12'. The electronic part 60 is contacted in an electrical manner by way of at least one contact-making means 67, 53 to the cable arrangement 50 that comprises at least one single conductor 52, 54. In the second exemplary embodiment, the main support 12' is also embodied as an open housing that comprises at least one insertion opening 14' for receiving the at least one contact-making means 67, 53 and a receiving pocket 16' for at least partial receiving the electronic part 60. In a similar manner to the first exemplary embodiment, an elastic cap 20' having means 24' for fastening the sensor unit 10' in the vehicle is provided in the second exemplary embodiment, which elastic cap is at least partially pushed over and/or pressed on to the main support 12' that is embodied as a housing and which elastic cap closes the receiving pocket 16' in a sealing manner. In the illustrated exemplary embodiment, the main support 12' is likewise embodied as a synthetic material injection molded part having a positioning lug 18' that renders it possible to assemble the sensor arrangement 1' in a positionally-correct manner in the vehicle.

In the illustrated second exemplary embodiment, the electronic part 60 of the sensor arrangement 1' is embodied as a passive inductive sensor that comprises a sensor element, which is embodied as a coil 64 with a pole piece 62, and a permanent magnet 68. In this case, two contact connecting pieces 66 render it possible to connect the coil 64 in an electrical manner to the single conductors 52, 54 of the cable arrangement 50. The assembled permanent magnet 68 is likewise preferably embodied as an NdFeB magnet (neodymium iron boron magnet).

As is further evident in FIG. 8, the contact-making means in the illustrated second exemplary embodiment in a similar manner to the first exemplary embodiment comprises two first contact sites 67 for contacting the electronic part 60 and two second contact sites 53 for contacting the cable arrangement 50, wherein the two first contact sites 67 are likewise embodied as a welded connection and the two second contact sites 53 are embodied as a crimped connection. The contact connecting pieces 66 and the crimp connectors 55 of the second contact sites 53 comprise the same material thickness, so that the wires of the coil 64 are welded directly to the crimp connectors 55 by way of the contact connecting pieces 66. A strain relief is already integrated into the crimp connectors 55, so that the loads on the weld sites are reduced. The cable arrangement 50 and the plug connector 40 correspond in construction, in mode of operation and assembly fundamentally to the embodiments of the first exemplary embodiment and will therefore not be discussed in more detail here.

As is further evident in FIG. 8, the elastic cap 20' comprises an internal sealing surface 23' that in a similar manner to the first exemplary embodiment together with a sealing bead 19' that is arranged on the main support 12' embodies an internal sealing region D1 in order to prevent moisture penetrating the receiving pocket 16'. In addition, the elastic cap 20' comprises an inner adhesive site 26' by means of which the pole piece 62 is adhered to the elastic cap 20'.

As is further evident in FIG. 8, the fastening means 24' of the elastic cap 20' comprise a stop surface 24.1' that in the assembled state lies on an edge of an insertion opening 5.1 of an assembly region 5 and embodies a fastening region B, as is evident in FIG. 9. Furthermore, the elastic cap 20' comprises an external sealing lip 22' that together with a corresponding surface of an insertion opening 5.1 embodies an external sealing region D2. As a consequence, the second sealing region D2 in the case of the second exemplary embodiment also seals the vehicle wheel and/or the vehicle motor with respect to the environment.

Alternatively, the fastening means 24' of the elastic cap 20' can comprise an outwardly open receiving groove 28 that in the assembled state encompasses an edge of an assembly opening 5.1' in the assembly region 5' and embodies a fastening region B', as is evident in FIG. 10. The outwardly open receiving groove 28 together with corresponding surfaces of the assembly opening 5.1' simultaneously embodies an external sealing region D2'. As a consequence, in a similar manner to the first exemplary embodiment the second sealing region D2' seals the gear box with respect to the environment.

Embodiments of the present disclosure use simple components that are already commercially available. Thus, the housing that is used for the sensor unit is a housing that requires only one injection molding process for the production process. In addition, contact is provided by means of a welding process that welds corresponding contact connecting pieces of the sensor element directly to the crimp connections. It is thus in an advantageous manner not necessary to provide conductor rails in order to produce the electrical connection between the sensor element and the cable arrangement and/or the plug connector. The conductor inside the sensor unit is used to adjust the length for variations that have different functional extensions. Single conductor seals are used to seal the conductors with respect to the sensor housing, as a consequence of which it is possible to avoid the danger of moisture penetrating the sensor unit by way of leakages along the conductor. The elastic cap assumes the task of sealing of the engine, gear box and/or wheel with respect to the environment, and the tasks of fastening the sensor unit in the assembly position without the use of screws and internally sealing the sensor unit with respect to the engine, gear box and/or wheel. Embodiments of the present disclosure render it possible to reduce the production costs of the sensor arrangement by way of using the simplest production processes and connection techniques. As a consequence, embodiments of the present disclosure provide a sensor arrangement that in an advantageous manner can be produced using a simple cost-effective production process and can be mounted in the vehicle by way of a simple assembly process by the vehicle manufacturer without the use of a screwdriver. Furthermore, embodiments of the present disclosure use a housing for which only one injection molding process is required, and inexpensive, mass-produced sub-components.

The invention claimed is:

1. A sensor arrangement for a vehicle comprising:
    a sensor unit including:
        a main support;
        an electronic part having a sensor element, the electronic part being connected to the main support; and
        an open housing that defines a plurality of insertion openings and a receiving pocket configured to at least partially receive the electronic part;
    a cable arrangement including a plurality of single conductors, each single conductor including a respective seal axially mounted thereon and corresponding to a respective one of the plurality of insertion openings;
    an elastic cap including a fastening mechanism to screwlessly fasten the sensor unit in the vehicle, the elastic cap being configured to be pushed at least partially over the main support, and close the receiving pocket in a sealing fashion; and
    a plurality of contact-making devices configured to electrically connect the cable arrangement to the electronic part, a respective contact-making device corresponding to and inserted with an end of each single conductor into the respective one of the plurality of insertion openings such that each of the plurality of insertion openings is sealed via the respective seal of each single conductor.

2. The sensor arrangement as claimed in claim 1, wherein the main support includes a synthetic material injection molded part having a positioning lug.

3. The sensor arrangement as claimed in claim 1, each of the contact-making devices including at least one first contact site configured to contact the electronic part and at least one second contact site configured to contact the cable arrangement.

4. The sensor arrangement as claimed in claim 3, wherein at least one of (i) the at least one first contact site has a welded connection, and (ii) the at least one second contact site includes a crimped connection.

5. The sensor arrangement as claimed in claim 1, wherein the fastening mechanism of the elastic cap includes a stop surface configured in an assembled state to be positioned on an edge of an assembly opening of an assembly region of a vehicle.

6. The sensor arrangement as claimed in claim 1, wherein the fastening mechanism of the elastic cap includes an outwardly open receiving groove configured in an assembled state to encompass an edge of an assembly opening of the vehicle in an assembly region.

7. The sensor arrangement as claimed in claim 1, wherein:
the elastic cap includes an internal sealing surface,
the main support includes a sealing bead arranged on the main support, and
the internal sealing surface and the sealing bead define an internal sealing region.

8. The sensor arrangement as claimed in claim 1, wherein the elastic cap includes an external sealing lip which, together with a corresponding surface of an assembly opening of the vehicle, is configured to define an external sealing region that seals the assembly opening.

* * * * *